US011161630B2

(12) United States Patent
Welle

(10) Patent No.: US 11,161,630 B2
(45) Date of Patent: Nov. 2, 2021

(54) FREE-FLOATING SPHERICAL GIMBAL

(71) Applicant: The Aerospace Corporation, El Segundo, CA (US)

(72) Inventor: Richard P. Welle, Huntington Beach, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 46 days.

(21) Appl. No.: 16/742,860

(22) Filed: Jan. 14, 2020

(65) Prior Publication Data

US 2021/0214105 A1 Jul. 15, 2021

(51) Int. Cl.
*H04B 10/00* (2013.01)
*B64G 1/10* (2006.01)
*B64G 3/00* (2006.01)
*B64G 1/24* (2006.01)
*B64G 1/36* (2006.01)
*F16M 11/18* (2006.01)
*B64G 1/42* (2006.01)

(52) U.S. Cl.
CPC .......... *B64G 1/1007* (2013.01); *B64G 1/244* (2019.05); *B64G 1/361* (2013.01); *B64G 3/00* (2013.01); *F16M 11/18* (2013.01); *B64G 1/425* (2013.01)

(58) Field of Classification Search
CPC ... H04B 10/11; H04B 10/112; H04B 10/1123; H04B 10/1125; H04B 10/1127; H04B 10/1129; H04B 10/118; H04B 10/1143; H04B 10/1149; H04B 10/40; H04B 10/1121; G01C 19/28; G01C 19/48; B64G 1/1007; B64G 1/244; B64G 1/361
USPC ....... 398/118, 119, 120, 121, 122, 123, 124, 398/125, 127, 128, 129, 130, 131, 135, 398/136
See application file for complete search history.

(56) References Cited

U.S. PATENT DOCUMENTS

2007/0031151 A1* 2/2007 Cunningham ..... H04B 10/1123
398/131
2015/0316376 A1* 11/2015 Williams ............... G01C 19/48
74/5.6 A

* cited by examiner

*Primary Examiner* — Hanh Phan
(74) *Attorney, Agent, or Firm* — LeonardPatel PC

(57) ABSTRACT

A free-floating spherical gimbal ("gimbal") that includes a moving portion substantially spherical in shape and partially enclosed within a larger spherical and stationary cavity. The moving portion of the spherical gimbal is maintained in a location without direct mechanical contact with the stationary cavity.

27 Claims, 9 Drawing Sheets

FREE-FLOATING SPHERICAL GIMBAL

FIELD

The present invention relates to a gimbal, and more particularly, to a free floating spherical gimbal.

BACKGROUND

Communication in Low Earth Orbit (LEO), either from LEO to ground, or between satellites in LEO, is accomplished almost exclusively using radio-frequency (RF) communication systems. There exists a broad range of RF communication systems, but they are all constrained by fundamental physical limits on the rate at which information can be transmitted and received. Although RF systems have proven to be adequate for most missions to date, the rapid acceleration in development of commercial, civil, and defense-related satellite systems in LEO is increasingly leading to communication constraints imposed by bandwidth limitations in RF systems.

An alternative to RF that has been proposed, and demonstrated for selected applications, is optical communication, in which information is communicated through modulation of a laser beam transmitted from a source to a receiver. Laser communication systems are capable of data transmission at much higher rates than RF systems, and the total bandwidth available in the optical spectrum is many orders of magnitude greater than in the RF spectrum. High data rates can be achieved with optical systems by way of tightly-focused laser beams that are precisely and accurately steered toward the intended receiver. To a first approximation, the data rate achievable with an optical system is proportional to the intensity of the optical signal at the receiver. The signal intensity can be increased by increasing the total laser power, and/or by improving the pointing accuracy and narrowing the beam divergence.

Laser beam divergence occurs in two dimensions, so the signal intensity at the laser beam center is inversely proportional to the square of the beam divergence. This means that, while doubling the laser power will increase the signal intensity by a factor of two at the receiver, reducing the beam divergence by a factor of two will increase the signal intensity by a factor of four at the receiver, provided the beam steering system is able to align the beam with the receiver. As such, laser communication systems tend to be designed with low-to-moderate laser powers (e.g., a few hundred milliwatts to a few watts), but with highly-precise beam steering mechanisms, typically incorporating gimbals. To date, highly-precise beam steering gimbal systems have been demonstrated only on relatively large (e.g., 100 kg plus) satellites, with communication terminals that mass over 30 kg and cost many millions of dollars. These systems are incompatible with the current trend toward ultra-small satellites (e.g., CubeSats), and represent a significant cost even for larger satellite systems.

The AeroCube-7 Optical Communication and Sensor Demonstration (OCSD), a 1.5-unit CubeSat with a total mass under 2.5 kg, overcame this challenge by dispensing with the gimbal altogether, mounting the laser directly to the satellite body, and using the spacecraft attitude-control system (ACS) to point the laser by precisely controlling the orientation of the entire satellite. This worked well for OCSD because OCSD needed to point at only a single target at any given time, and because the small size and mass of the OCSD spacecraft meant that the ACS could be exceptionally agile, supporting pointing and tracking of a ground target using the entire spacecraft body. However, larger satellites, or those without high-precision attitude-control systems, may find full-spacecraft tracking of a ground target challenging. Furthermore, a communications relay satellite may need to point simultaneously at both an incoming signal source and an outgoing signal destination, a requirement that cannot be satisfied with only body pointing in a single satellite.

Because satellites move in three dimensions, it may be necessary to steer a communications beam in two dimensions for unpolarized beams or in three dimensions (two to define the pointing vector and one for rotation about that vector) for polarized beams. Currently, communications beams are steered using spherical gimbals (sometimes called ball gimbals) that provide two or three axes of rotation.

Conventional spherical gimbals provide an interface between moving and stationary parts and come in two types.

In the first type, the interface between the moving and non-moving parts of the gimbal is spherical, with a spherical rotor supported in and partially enclosed within a spherical stator. The orientation of the rotor is controlled using drive wheels mounted on the stator and in mechanical contact with the rotor at various locations. The construction is similar to that of a mechanical computer mouse, e.g., in the way that the mouse contains a ball free to move in reaction to the motion of the mouse across a surface, and friction wheels mounted in mechanical contact with the ball so as to track the motion of the ball. In the case of the computer mouse, the friction wheels do not control the orientation of the ball, but are instead moved by the ball as its orientation changes, allowing orientation changes to be measured. In a spherical gimbal, however, the corresponding friction wheels are used to control the motion of the sphere within the gimbal.

The second type of spherical gimbal includes two or three single-axis gimbals stacked together such that the central component may be moved through a range of two or three axes of rotation by an appropriate combination of the rotation of each of the single-axis gimbals.

In both types of spherical gimbal systems, there is a direct mechanical connection between the moving and stationary parts of the gimbal. This direct mechanical connection provides control of the location and orientation of the moving part, and in some cases also provides a pathway for the transfer of power and/or data across the interface. In typical optical communication systems, the requirement for pointing precision drives the use of exquisite mechanical systems designed to give highly-precise pointing while minimizing any transfer of mechanical disturbances (vibrations) across the interface. These mechanical systems tend to be substantially larger and more massive than the laser transmitters and/or receivers they are supporting. Such gimbals, however, are generally too costly and massive for CubeSats or other small satellites. Thus, there is a need for a laser communication system with a gimbal that can provide complete freedom of rotation for the pointing vector of an optical communications system and can support a broad range of satellites at a moderate cost and without putting undue burden on the satellites.

SUMMARY

Certain embodiments of the present invention may provide solutions to the problems and needs in the art that have not yet been fully identified, appreciated, or solved by current spherical gimbal systems. For example, some embodiments generally pertain to a laser communication system with a gimbal to provide complete freedom of rotation for the pointing vector of the optical communications system and to support a broad range of satellites at a moderate cost and without putting undue burden on the satellites.

In an embodiment, a free-floating spherical gimbal ("gimbal") that includes a moving portion substantially spherical in shape and partially enclosed within a larger spherical and stationary cavity. The moving portion of the spherical gimbal is maintained in a location without direct mechanical contact with the stationary cavity.

In another embodiment, a spherical gimbal includes a plurality of moving parts and a plurality of stationary parts, with a spherical interface between the plurality of moving parts and the plurality of stationary parts. The plurality of moving parts are free-floating, in some embodiments.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a spherical gimbal that includes moving and stationary parts, with a spherical interface between the moving and stationary parts, and the moving portion of the spherical gimbal being free-floating, i.e., held in location (but not orientation) by electrostatic, magnetic, and/or electromagnetic forces (in spacecraft) or by gas-dynamic forces (in terrestrial applications). Further, the spherical gimbal does not require a mechanical connection between the moving and stationary portions of the gimbal. The orientation of the moving portion of the spherical gimbal is controlled internally through momentum management, and without any direct mechanical connection to the stationary part of the spherical gimbal.

For purposes of explanation, the term "gimbal" will be used throughout the remaining disclosure to refer to a mechanism that enables rotary motion between two mechanical components—'rotor' and 'stator'. The term "rotor" is used to identify the moving portion of the gimbal, and the term should be understood to include all components attached to and/or contained within the moving portion of the spherical gimbal. The term "stator" is used to identify the stationary part of the gimbal. It should be understood that "stationary" in this sense means stationary with respect to the vehicle or host on which the gimbal is mounted, notwithstanding that the vehicle or host may, itself, be moving or rotating with respect to an inertial frame of reference.

Figure 1:
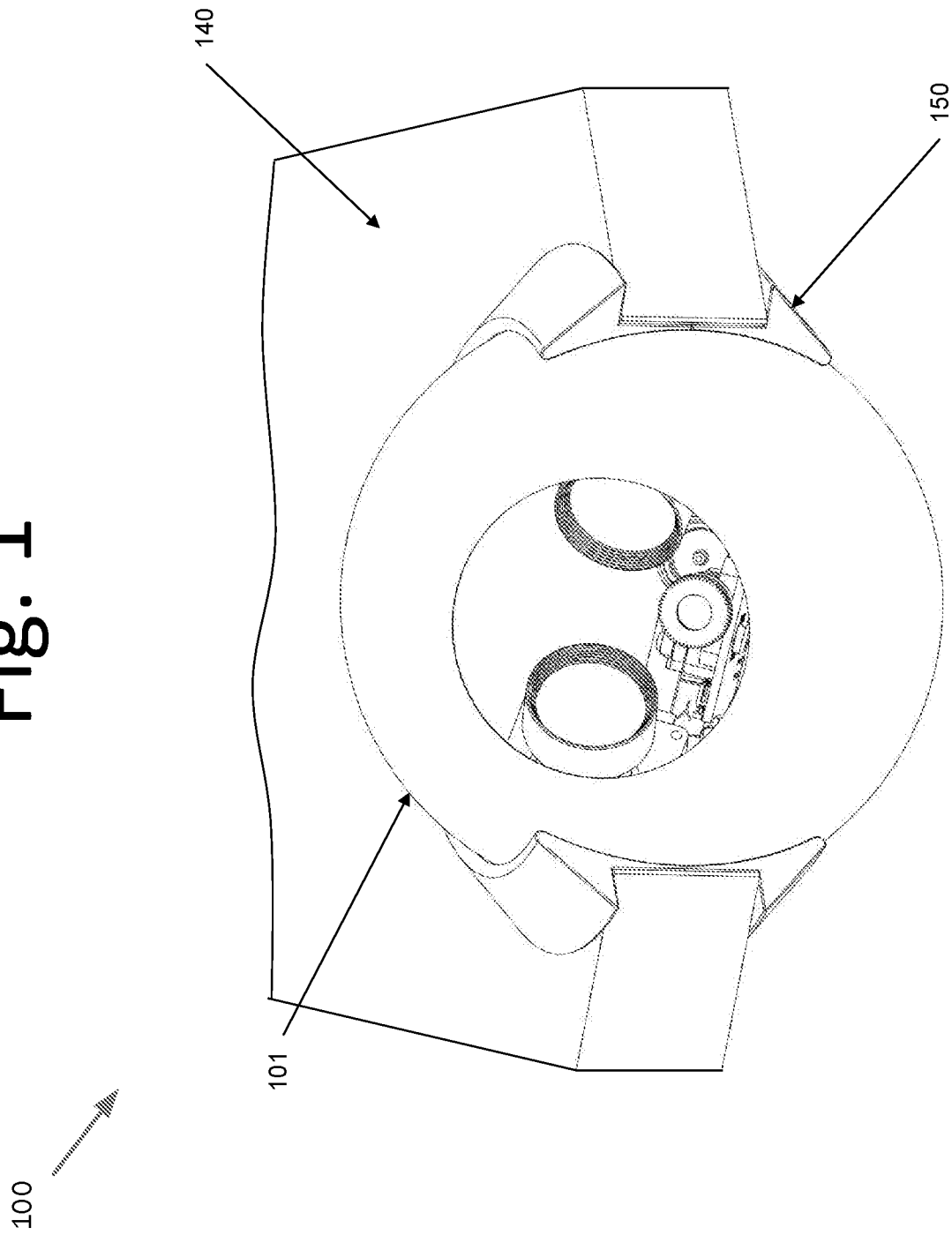
FIG. 1 is a diagram illustrating a perspective view of a self-contained free-floating spherical gimbal, according to an embodiment of the present invention.
Figure 2:
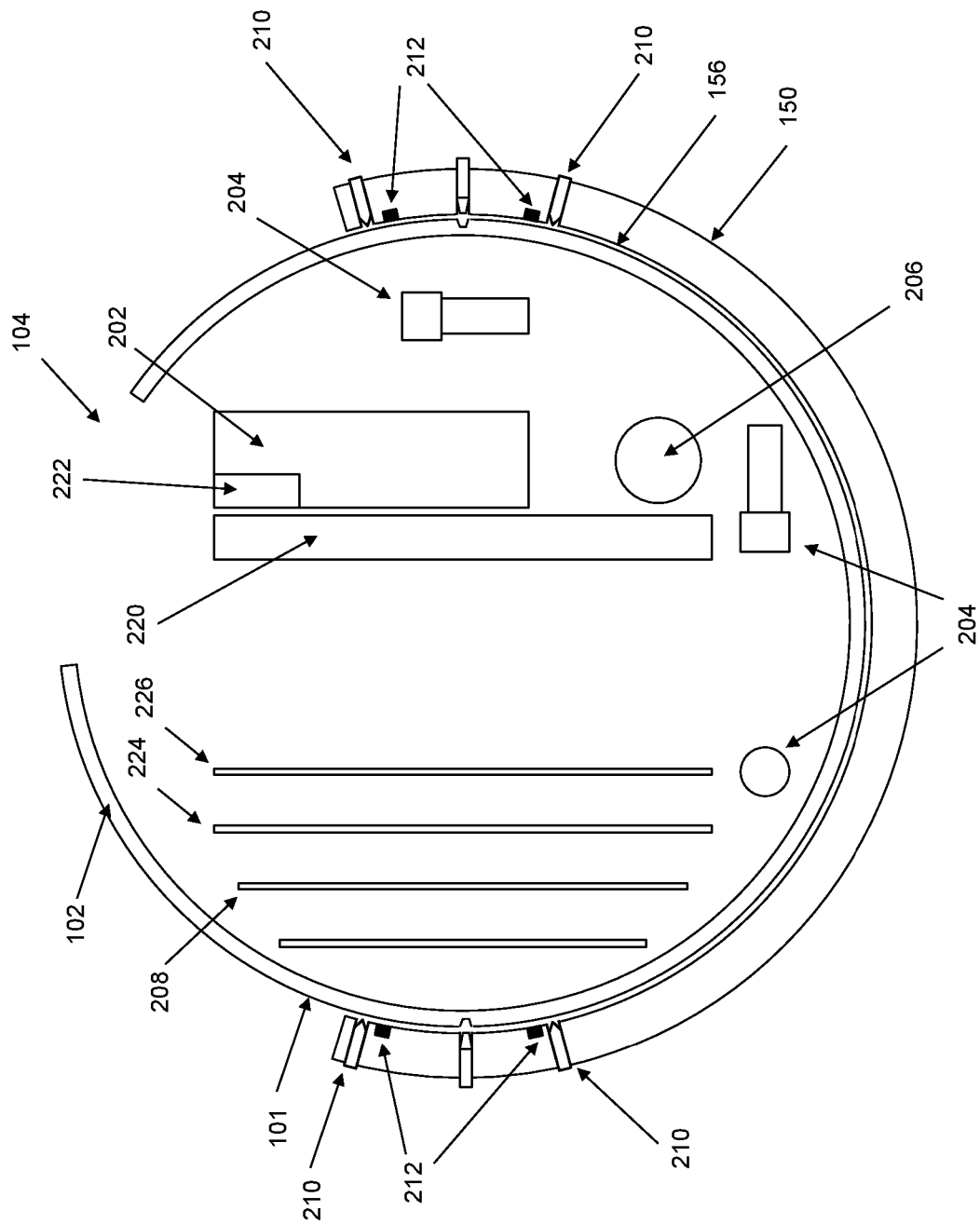
FIG. 2 is a diagram illustrating a cross-sectional view of a self-contained free-floating spherical gimbal, according to an embodiment of the present invention.

FIG. 1 is a diagram illustrating a perspective view of a free-floating spherical gimbal 100, which includes rotor 101 and a stator 150, mounted on a vehicle 140 according to an embodiment of the present invention. FIG. 2 is a diagram illustrating a cross-sectional view of the free-floating spherical gimbal 100, which includes rotor 101 and stator 150. In an embodiment, a rotor 101 includes a spherical shell 102 with one or more openings 104 to allow access for optical or other electromagnetic signals. Spherical shell 102 is constrained against lateral movement by partially enclosing it within a spherical cavity 152 in stator 150. Spherical cavity 152 may have openings or transparent windows 154, which allow access for optical or other electromagnetic signals over a variety of directions with respect to the orientation of the stationary portion of the gimbal.

Mounted in stator 150 are actuators 210 that provide forces necessary to center the rotor within stator 150. Rotor 101 may include components necessary to measure and control the orientation of rotor 101 including star camera 202 to measure orientation, reaction wheels 204 to change orientation through momentum conservation, battery 206 and power electronics 226 to provide electric power, and attitude-control system 208 to read data from star camera 202 and control reaction wheels 204. In some additional embodiments, rotor 100 includes components necessary to a laser communication system. For example, these components include laser 220, laser output optics 222, and electronics 224 to control the laser. The laser transmitter may be pointed in various directions with respect to the orientation of the stationary cavity by using the reaction wheels 204 to control the orientation of rotor 101.

Although free-floating spherical gimbal 100 is provided in this embodiment with reference to an optical communications system, one of ordinary skill in the art would appreciate that spherical gimbal 100 may also be useful for other applications such as for camera systems mounted to unsteady platforms.

Figure 3:
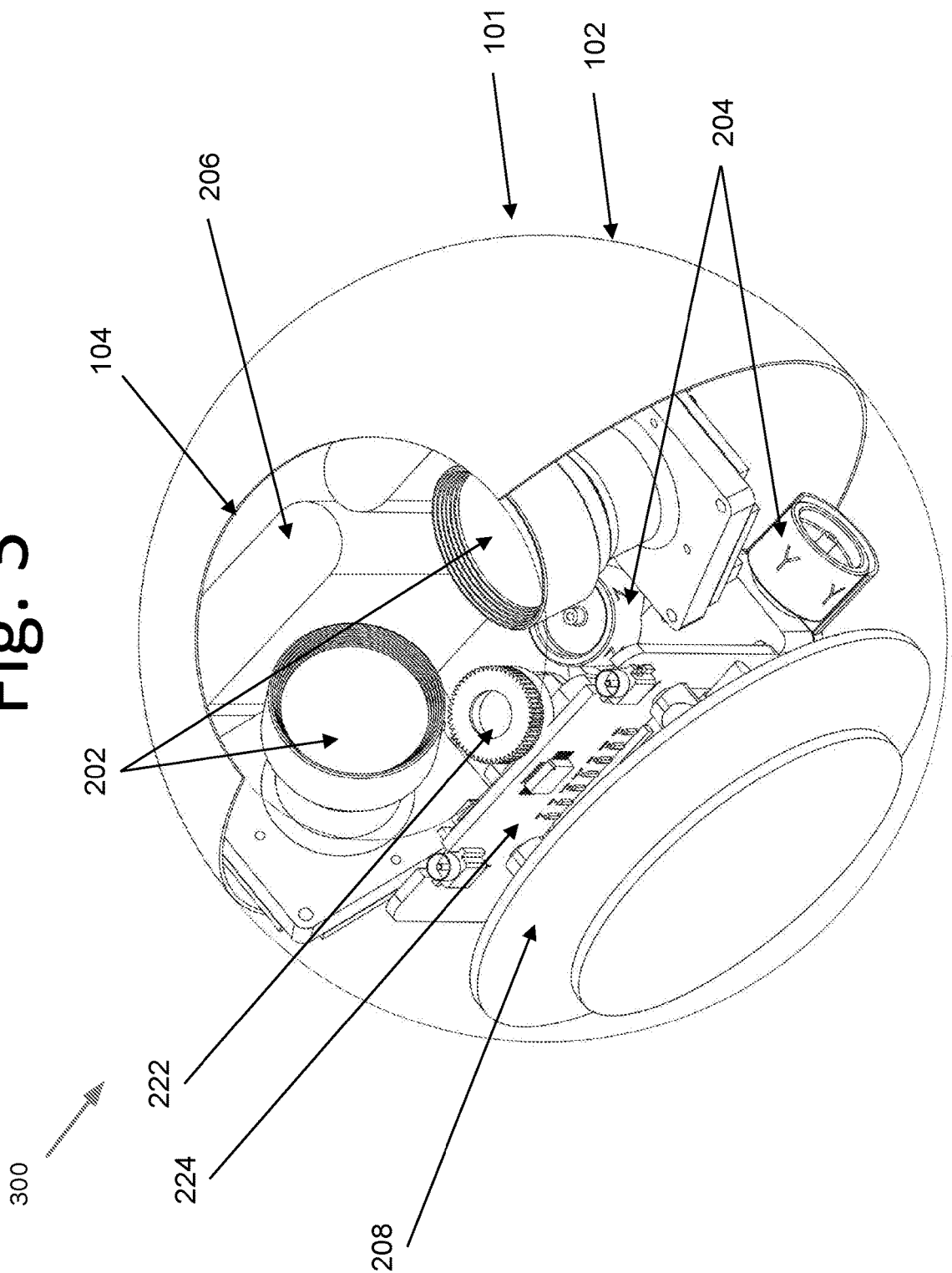
FIG. 3 is a diagram illustrating a perspective view of a rotor for the free-floating spherical gimbal, according to an embodiment of the present invention.

FIG. 3 is a diagram illustrating a perspective view of a rotor 101 for a free-floating spherical gimbal, according to an embodiment of the present invention. In an embodiment, rotor 101 includes spherical shell 102 with one or more openings 104 or transparent windows (not shown) to allow access for optical or electromagnetic signals. Contained within the cavity of spherical shell 102 is a laser transmitter 220 (not visible) with output optics 222, star cameras 202, and one or more reaction wheels 204. Laser transmitter 220 may transmit a laser beam to another satellite or to ground. In one example, reaction wheels 204 spin, causing a counter-rotation of rotor 101 to align laser transmitter output optics 222 with an optical receiver on another satellite (not shown). Laser transmitter 220 then transmits optical data toward the receiver on the other satellite.

Star camera 202 may acquire images of a starfield. The locations of the stars in the starfield image are compared with a database of stellar locations to determine the pointing vector of star camera 202. By incorporating star camera 202 within rotor 101, the orientation of rotor 101 may be measured without reference to the orientation of the stator. This allows the control system to orient rotor 101 as necessary to direct the laser beam from output optics 222 toward an intended receiver. In another embodiment, star camera 202 acquires one or more images of a beacon sent by the laser communications receiver to aid in orienting rotor 101 to direct the laser transmitter output optics 222 toward the receiver.

Reaction wheels 204 may change the orientation of rotor 101 to any desired setting. For example, with a laser transmitter 220, a star camera 202, and a three-axis set of reaction wheels 204, reaction wheels 204 may move rotor 101, analogous to a free-flying spacecraft, in such a manner as to have the laser beam track a point on the ground (for space-to-ground laser communications) or another satellite (for space-to-space laser communications).

Successful implementation of the gimbal may require several components such as a containment and levitation unit for rotor 101; means for measuring the orientation of rotor 101 with respect to the host vehicle and/or with respect to free space; means for controlling the orientation of rotor 101; means for managing the stored angular momentum on rotor 101; means for transferring power to the rotor 101; and means for transferring data to and from the rotor 101. Each of these will be discussed in detail below.

Containment and Levitation

In some embodiments, rotor 101 is constrained within stator 150 while providing three degrees of rotational freedom and substantial mechanical isolation from stator 150 and host. This is accomplished by giving rotor 101 a spherical shape, placing it within a spherical housing or cavity 152, and providing a small gap 156 between the outer diameter of rotor 101 and inner diameter of cavity 152. Cavity 152 in some embodiments is partially open, or even open over a majority of its surface, provided that there is enough surface remaining to contain actuators 210 to provide the necessary forces to maintain rotor 101 substantially centered in cavity 152. The open portion of cavity 152 provides preferential views for rotor 101 in certain directions, either through physical openings or through transparent windows. It may also be beneficial to provide a cavity that is, in itself, capable of rotation, albeit with mechanical drives that are not necessarily precise, in order to move the open portion of cavity to selected locations to provide appropriate unobstructed fields of view for rotor 101.

For terrestrial applications, or anywhere an atmosphere is present, the centering forces may be applied gas-dynamically by using gas jets or films. Similarly, in underwater applications the centering forces may be applied hydrodynamically by using water jets or films. In space applications, where a ready supply of gas may be unavailable, the forces used to maintain rotor 101 in location can be provided by electrostatic, magnetic, electromagnetic, and/or electrodynamic actuators.

In an embodiment, electrostatic levitation is accomplished by maintaining an electric charge on rotor 101. Actuators in the stator wall may generate electric fields in the gap 156 between rotor 101 and stator 150 to attract or repel rotor 101, and proximity sensors 212 in stator wall may measure the width of the gap enabling a feedback loop to control the field strengths to maintain centering of rotor 101.

In another embodiment, electromagnetic levitation is accomplished with actuators to create appropriate magnetic fields, and again, using feedback loops to adjust field strengths to maintain centering. In yet another embodiment, levitation forces are provided by electrodynamic suspension, a form of magnetic levitation in which a conducting material is repelled by an oscillating magnetic field. This repulsion comes about because eddy currents are induced in the conductor in response to the oscillating magnetic field. The eddy currents generate a magnetic field that is opposite in polarity to the applied magnetic field, and the two magnetic fields repel one another.

In yet another embodiment, levitation forces are provided by diamagnetic repulsion. Certain materials (e.g., pyrolytic carbon) have diamagnetic constants large enough that they can be repelled by strong magnetic fields with large gradients. While this force is very weak, and sufficient to levitate only very small samples on Earth, in the zero-g environment of space, the required levitation forces are orders of magnitude smaller. Further, diamagnetic levitation is an attractive option, since it requires no power and can be configured to create a levitation system that is dynamically stable without need of active controls.

For embodiments using levitation systems that do require active control, a system is provided to measure the location of rotor 101 within cavity 152. In principle, it may be possible to measure the location of rotor 101 within cavity 152 with feedback from the levitation drive elements. However, additional proximity sensors 212 may be preferred in some embodiments.

In terrestrial levitation applications, the forces generated have to overcome the local gravitational acceleration. This may lead to high power requirements for electrostatic or electrodynamic levitation. However, for space applications, the forces required are several orders of magnitude smaller. In those applications, the power requirements are modest.

The magnitude of the forces that would need to be generated by the levitation elements can be estimated by making basic assumptions about the dimensions and motions of the host spacecraft. For example, assuming the rotor cavity is 1 meter from the center of mass of the host spacecraft, and that the maximum angular acceleration of the host spacecraft is 1 deg/s$^2$, then the maximum linear acceleration of the rotor cavity will be about 2 milli g. If the rotor mass is about ½ kg, the maximum force that would be needed to maintain centering would be about 10 mN.

Figure 4:
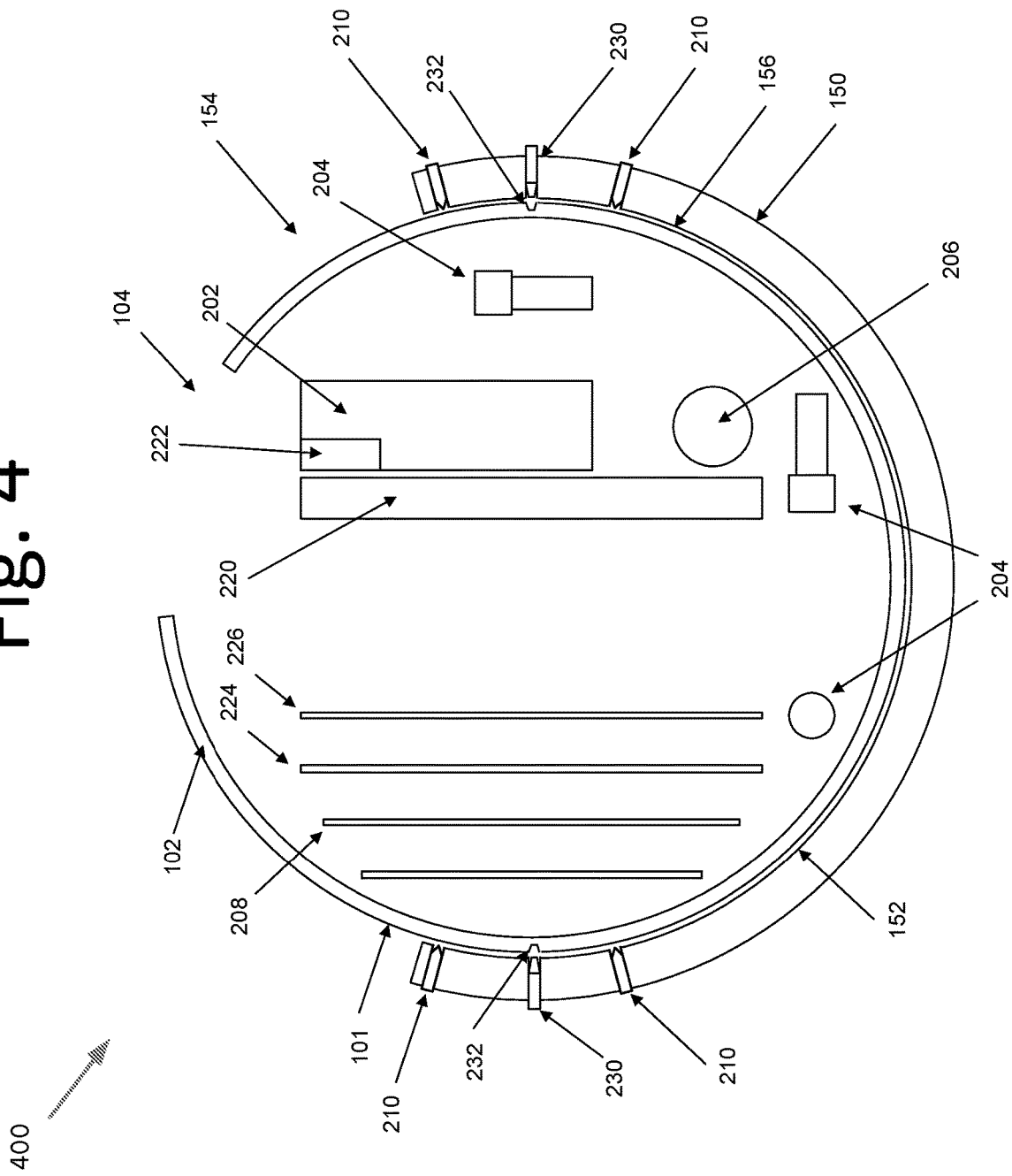
FIG. 4 is a cross-sectional view of free-floating spherical gimbal showing docking mechanism, according to an embodiment of the present invention.

Note that this is only the maximum force—most of the time the host satellite will not be maneuvering and the magnitude of any accelerations will be much lower. An alternative approach that would reduce the maximum force needed to maintain centering would be to provide a docking capability that would mechanically lock rotor 101 in the cavity when any spacecraft maneuvering is planned. FIG. 4 is a diagram illustrating a cross-sectional view of a spherical gimbal 100 with retractable docking probes 230 in stator 150, according to an embodiment of the present invention. In an embodiment, retractable docking probes 230 extend to make physical contact with rotor 101 and hold rotor 101 in place.

The same docking capability could provide support for rotor 101 during space launch when the forces required to keep the rotor free floating would be orders of magnitude larger. Such a docking system could consist simply of mechanical probes that would extend from the cavity wall to make solid physical contact with the surface of rotor 101. Rotor 101 may also incorporate hard points 232 aligned to mate with the mechanical probes from the cavity wall.

Another possible source of lateral forces would be if the center of mass of rotor 101 is offset from its center of rotation. In that case, when a torque is applied to rotor 101 that results in a rotation about an axis that does not include the center of mass, then there is a corresponding movement of the center of mass relative to the geometric center of the cavity in stator 150. In this example, a lateral force keeps rotor 101 centered in the cavity 152. The magnitude of that lateral force depends on the mass of rotor, the magnitude of the offset of the center of mass, and the maximum rotation speed of rotor 101. As such, some embodiments include a rotor 101 with its center of mass at its center of rotation. However, in other embodiments, the levitation actuators are sized to provide the necessary lateral force at the maximum allowed rotation speed of rotor 101. In certain embodiments, the rotation speed is limited to minimize the corresponding lateral forces.

Orientation Measurement

Figure 5:
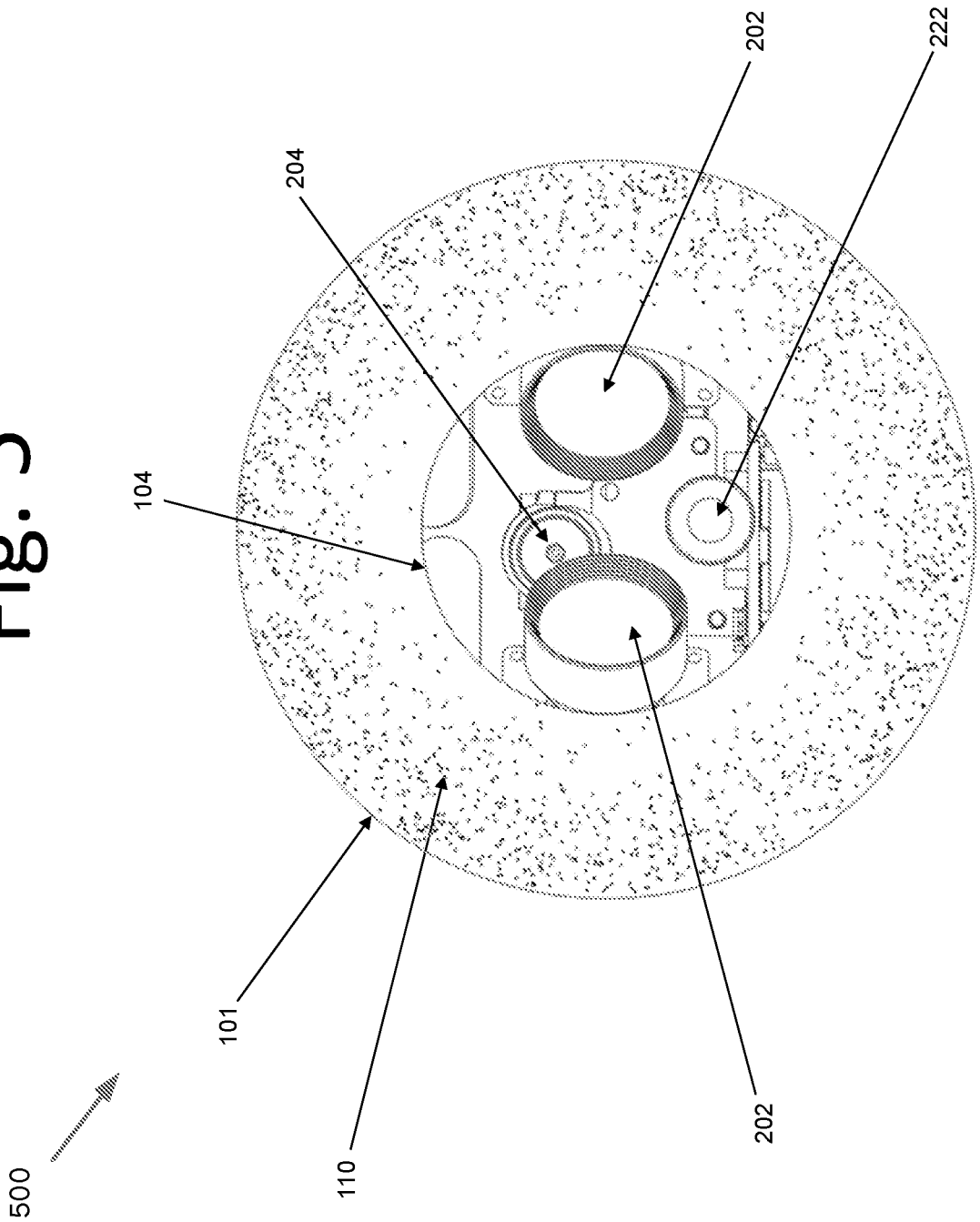
FIG. 5 is a diagram illustrating a perspective view of a rotor for the free-floating spherical gimbal incorporating a pattern of reference spots for orientation measurements, according to an embodiment of the present invention.

In laser communication applications, the requirements for maximum pointing uncertainty for the laser beam may be on the order of ten microradians or smaller. To support that level of pointing uncertainty in the gimbal, a measurement device may be provided to measure the orientation of rotor 101 to an uncertainty smaller than the required pointing uncertainty. In spacecraft, highly accurate attitude measurements are typically made using star cameras. For example, star cameras acquire images of a starfield and the locations of the stars in the image are compared with a database of stellar locations to determine the pointing vector of the star camera. The orientation of rotor 101 in the gimbal is measured using the same method by incorporating a star camera in rotor 101 and allowing the star camera to image a starfield. Alternatively, a measurement device may be provided to measure the orientation of the rotor 101 relative to stator 150, and therefore relative to the spacecraft or other vehicle on which the stator is mounted. For example, FIG. 5 is a diagram illustrating a perspective view of a rotor 101 with a non-repeating pattern of spots on the surface of rotor 101. A camera or another detector on stator 150 can detect the spots and analyze the image, in a manner analogous to the operation of a star camera, to determine the orientation of rotor 101 relative to stator 150. This is, in essence, an artificial star camera system. A similar capability could be provided with a non-repeating pattern of lines on the surface of stator 150.

In combination with this, another star camera may be used by the host spacecraft to obtain spacecraft attitude information, and a combination of spacecraft attitude with the orientation of rotor 101 relative to the spacecraft yields the absolute orientation of rotor 101. In another embodiment, it may be useful for the spacecraft to provide preliminary pointing information to rotor 101 based on spacecraft attitude and relative rotor orientation, for the purpose of assisting the rotor-based star sensor by limiting the size of the star catalog that must be searched to determine the absolute orientation of rotor 101.

In some embodiments, laser communication systems use beacons to assist in pointing. For example, a beacon laser may be co-located with an optical receiver and pointed at the communications laser transmitter. A detector at the transmitter, such as a star camera sensitive to the beacon laser wavelength, or a quad-cell photodetector, determines the direction to the optical receiver with a high degree of precision to support laser pointing in the gimbal. A similar system may be used to point an optical receiver in the gimbal.

Orientation Control

Since rotor 101 is not in mechanical contact with the spherical cavity containing it, it is free to rotate about its geometric center to any orientation within the cavity. In a manner similar to a free-flying spacecraft, the torques required to rotate rotor 101 within the cavity are, in general, provided from within rotor 101 through the use of momentum storage devices such as reaction wheels or control moment gyros (CMGs).

In the OCSD spacecraft, the communications laser is hard-mounted to the spacecraft body, and the laser is pointed by controlling the orientation of the whole spacecraft. The control authority for effecting orientation changes is provided by a set of three mutually orthogonal reaction wheels. In the absence of any external torques on the spacecraft, a motorized wheel, when rotated in one direction, will cause the spacecraft as a whole to rotate in the opposite direction by an amount that conserves angular momentum. Relatively small reaction wheels, when rotated at high speed, can cause a much larger spacecraft to rotate at modest speeds in the opposite direction. In the OCSD spacecraft, the reaction wheels have a diameter of 13 mm and a mass, including the motor, under 10 g. These reaction wheels are rotated up to 1500 revolutions per second to rotate the spacecraft at rates approaching 10 degrees per second.

From a dynamics and controls standpoint, the rotor of the free-floating spherical gimbal is comparable to a small free-flying satellite. In a free-flying satellite, lateral motion is driven by orbital mechanics and the orientation is controlled by attitude actuators, primarily reaction wheels or control moment gyroscopes. In the embodiment of rotor 101 being in the gimbal, lateral motion is constrained by the levitation elements in the spherical wall of stator 150, and orientation of rotor 101 is controlled, in the same manner as free-flying satellites, by attitude actuators such as reaction wheels or CMGs. A three-axis set of reaction wheels may change the orientation of rotor 101 to any desired setting. More specifically, given rotor 101 such as that shown in FIG. 3, with a laser transmitter, a star camera, and a three-axis set of reaction wheels, rotor 101 is moved using the reaction wheels, analogous to a free-flying spacecraft, in such a manner as to have the laser beam track a point on the ground (for space-to-ground laser communications) or another satellite (for space-to-space laser communications).

Momentum Management

In a spacecraft with orientation controlled by reaction wheels, there can be a buildup of stored angular momentum in the reaction wheels due to unbalanced torques on the spacecraft acting over time. For example, residual magnetic moments in the spacecraft interacting with the Earth's magnetic field produce small torques on the spacecraft that are counteracted by a steady acceleration of one or more reaction wheels. If left unchecked, the speed of a reaction wheel may eventually exceed safe limits and control authority would be lost. To counteract this and similar effects, the spacecraft is equipped with additional attitude actuators, such as magnetic torque coils, for overall momentum management. A magnetic torque coil is an electromagnet that, when unpowered, has a negligible magnetic moment, and when powered, has a magnetic moment that interacts with the Earth's magnetic field to produce a torque on the spacecraft. Thus, if reaction wheel speeds become excessive, the spacecraft can actuate a magnetic torque coil to create a magnetic moment that interacts with the Earth's magnetic field to create a torque on the spacecraft in such a direction that it can be balanced by deceleration of one or more reaction wheels. Once wheel speeds have been reduced to acceptable levels, the magnetic torque coil is switched off.

When rotor 101 is in the gimbal, rotor 101 may experience small unbalanced torques that lead to a build-up of stored angular momentum in one or more reaction wheels. To counteract this effect, rotor 101 may include magnetic torque coils that interact directly with the Earth's magnetic field in the same manner as free-flying spacecraft. Alternatively, rotor 101 may include at least one momentum management device capable of transferring angular momentum between rotor 101 and stator 150, or directly between rotor 101 and the platform hosting stator 150. For example, stator 150 or host may be equipped with a collection of magnetic torque coils that may be actuated in conjunction with corresponding coils on rotor 101 to provide a torque that can be used to reduce stored angular momentum in the rotor's reaction wheels. In another embodiment, rotor 101 may temporarily dock with stator 150 using a direct mechanical connection while rotor 101 adjusts the speeds of its reaction wheels. In either of these embodiments, the net result is that stored angular momentum in the rotor's reaction wheels is transferred to the host vehicle. It is anticipated that the host vehicle has its own attitude-control system capable of maintaining spacecraft pointing and capable of shedding excess stored angular momentum. For the gimbal that is supported gas-dynamically, unbalanced torques are introduced through imbalances in the orientation or flow rates of the gas jets, or other environmental factors, and momentum-management torques may be applied electromagnetically or through adjustments in the direction and/or magnitude of the gas jets used to levitate the rotor.

Power Transfer

Maximum mechanical isolation between rotor 101 and the host vehicle is provided when there are no physical connections between the two. In such an embodiment, rotor 101 uses a source of electric energy to operate onboard components such as the reaction wheels, torque coils, cameras, and laser transmitter.

In an embodiment where rotor 101 is equipped with batteries for storing electric energy, and to maintain an acceptable state of charge, rotor 101 docks with stator 150 to create an electrical connection and draw power from the host vehicle to charge the batteries. One skilled in the art will recognize that the use of batteries is but one possible embodiment for storing electrical energy. Alternative embodiments include, for example, supercapacitors. For the purposes of discussion here, the term "battery" is intended to represent any means for storing electrical energy in rotor 101. In another embodiment, mechanical docking of rotor 101 may allow for extendable electrical probes in the cavity wall that make physical contact and establish electrical connection with rotor 101 when extended.

In an embodiment, rotor 101 may, when needed for a pointing exercise, undock from the host and operate with battery power. Whenever not needed for pointing, rotor 101 may redock with the host to recharge the batteries.

Figure 6:
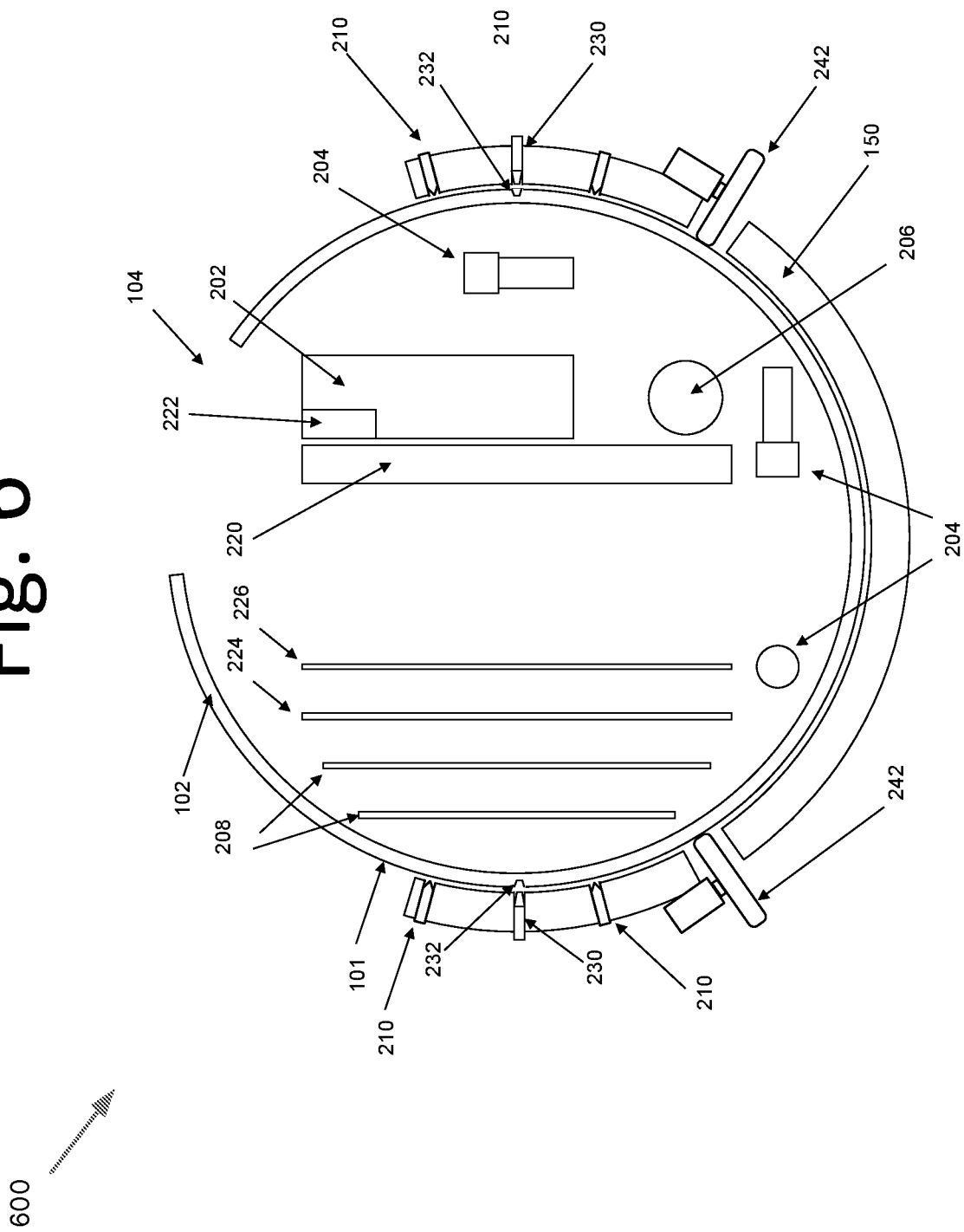
FIG. 6 is a diagram illustrating a cross-sectional view of a self-contained free-floating spherical gimbal with mechanical drive wheels, according to an embodiment of the present invention.

To ensure that the electrical probes contact rotor 101 at the appropriate locations, rotor 101 may orient itself to a specific orientation before docking. However, if the rotor batteries are fully depleted, rotor 101 won't have electric power to operate the reaction wheels. In those embodiments, retractable drive wheels within in the cavity wall orient a non-responsive rotor to an appropriate docking orientation. FIG. 6 is a diagram illustrating a cross-sectional view of a spherical gimbal incorporating retractable drive wheels in stator 150, according to an embodiment of the present invention. In an embodiment, retractable drive wheels 242 control the orientation of rotor 101 to move it to the docking orientation when the rotor's batteries are depleted and rotor 101 is unable to control its orientation under its own power. These retractable drive wheels may also be used for management of accumulated angular momentum in the rotor's reaction wheels.

In an alternative embodiment, the exterior surface of rotor 150 includes a few solar cells positioned such that at least one solar cell would be exposed at all times. In this embodiment, if the rotor batteries become fully depleted, the rotor batteries can be slowly charged by the solar cells until there is enough stored energy in the rotor batteries to allow the reaction wheels to correctly orient rotor 101 for docking.

Figure 7:
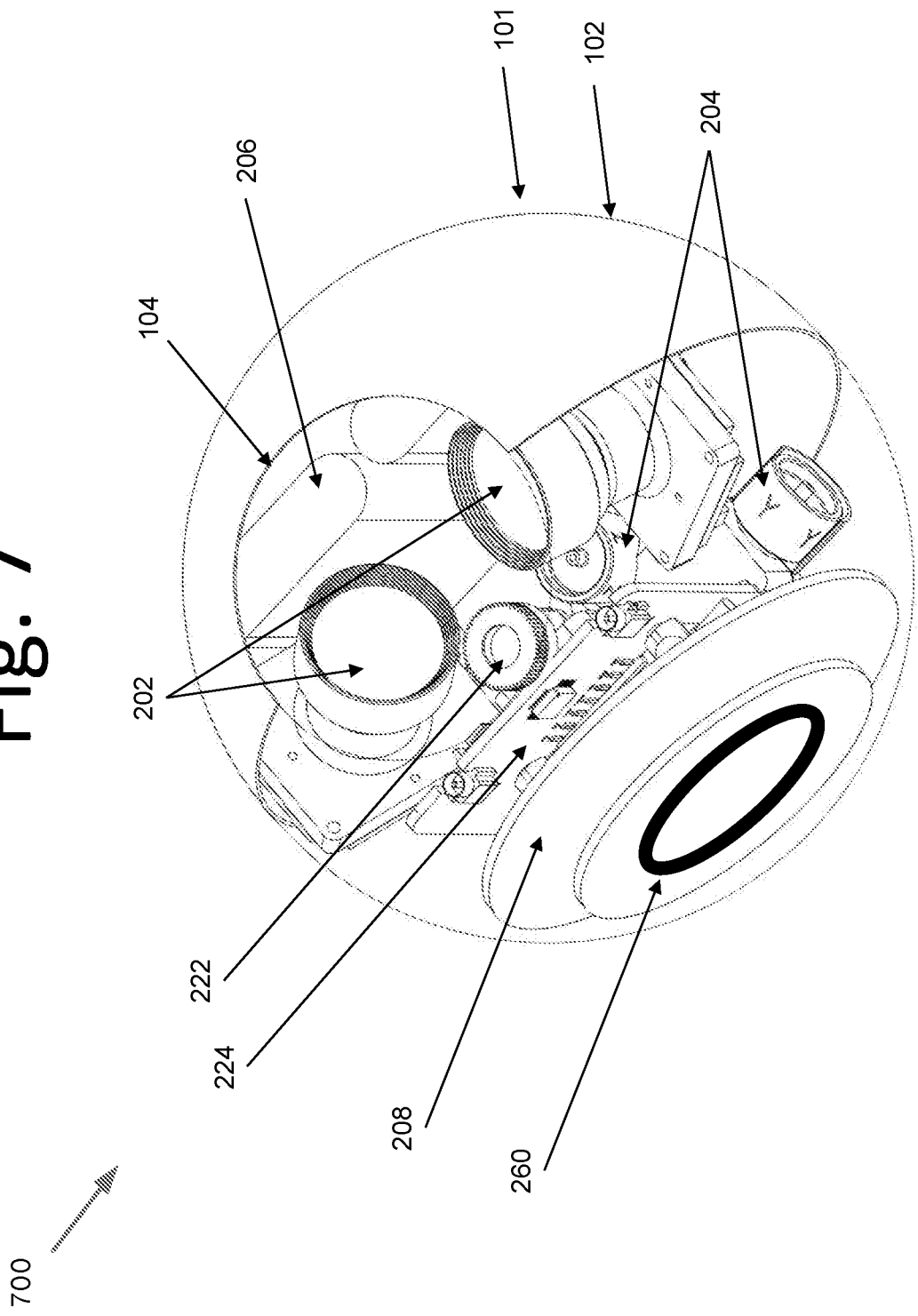
FIG. 7 is a diagram illustrating a perspective view of a self-contained free-floating spherical gimbal with wireless power transfer means, according to an embodiment of the present invention.

In another embodiment, rather than docking, a wireless power transfer system may charge the batteries in rotor 101. In an embodiment, solar cells on rotor 101 draw power from sunlight, or from laser or LED light sources provided by the host vehicle. Electromagnetic induction may also be used in some embodiments. For example, FIG. 7 is a diagram illustrating a perspective view of a rotor with an electromagnetic induction coil 260, according to an embodiment of the present invention. A matching coil (not shown) on the stator would excite the coil on the rotor, thereby transferring power to the rotor. In some embodiments, by using matching electromagnetic coils, electromagnetic induction is used between corresponding coils on rotor 101 and stator 150. This approach, however, may produce unacceptable lateral forces or torques on rotor 101 that would have to be offset with the levitation or orientation control actuators. As such, balanced sets of induction coils may be used for power transfer. In alternative embodiments, induction coils are used for power transfer when rotor 101 is docked in stator 150.

Another wireless power transfer method, suitable for rotors supported by gas-dynamic levitation, is acoustic power transfer. With any of these wireless power transfer methods, it may be beneficial to provide storage batteries on the rotor to balance power requirements and maintain a steady power supply when changes in the orientation of the rotor limit the capacity of the wireless power transfer system. Wireless power transfer may also be used primarily as a supplemental power supply for a rotor designed to dock for battery charging, but occasionally needing to remain undocked for a time longer than easily supported with the capacity of the onboard batteries.

Figure 8:
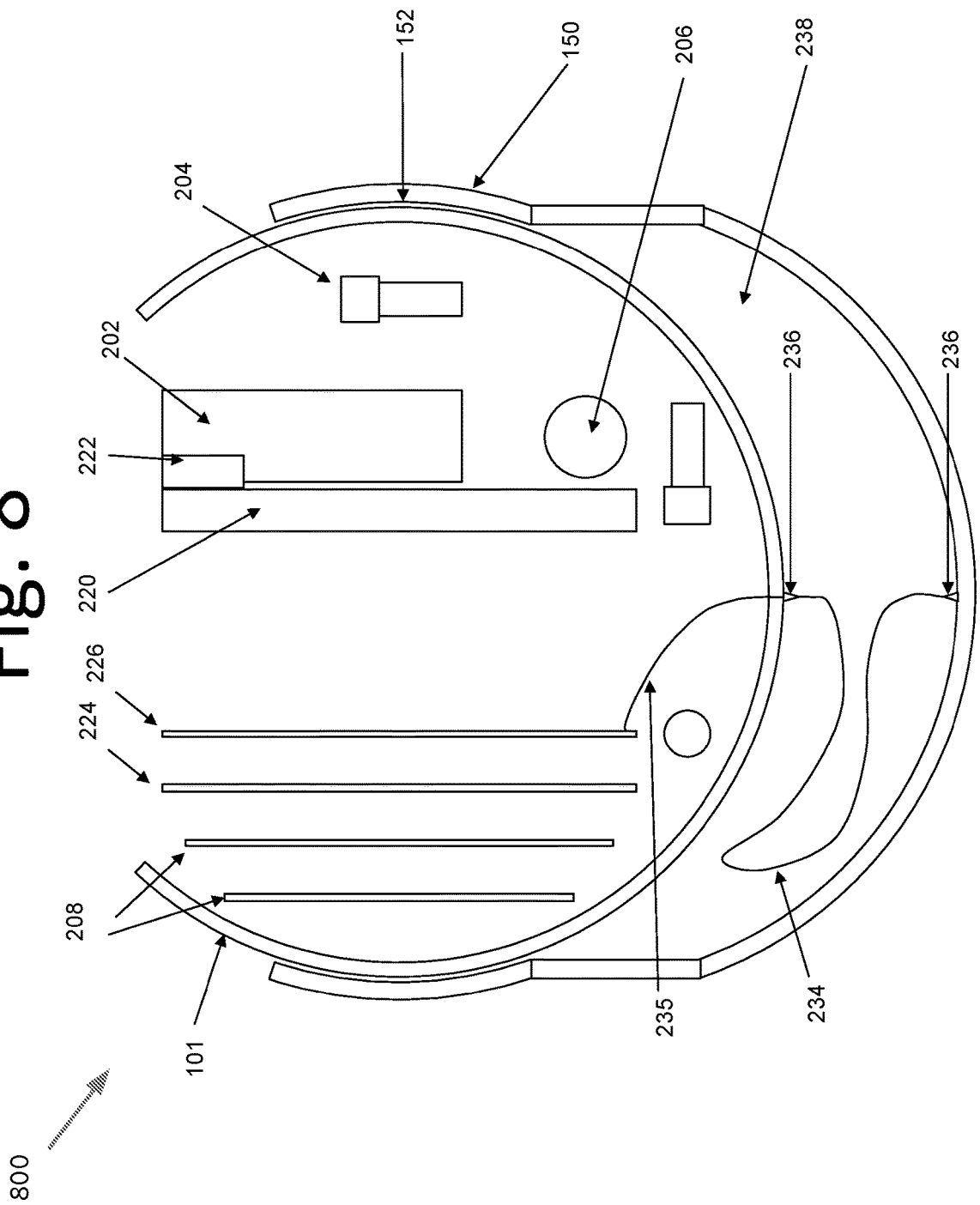
FIG. 8 is a diagram illustrating a cross-sectional view of a self-contained free-floating spherical gimbal with wired power transfer means, according to an embodiment of the present invention.

In embodiments where rotors have limited requirements for movement and limited requirements for mechanical isolation, a highly-flexible wired connection between the rotor and the cavity wall is provided. In these embodiments the wire is sufficiently long and flexible to exert small and acceptable torques on the rotor when the rotor is moved within its restricted range. At the same time, the flexibility of the wire limits its ability to transfer mechanical vibrations between the rotor and the cavity wall. FIG. 8 is a diagram illustrating a cross-sectional drawing of a spherical bearing, according to an embodiment of the present invention. In this embodiment, an extension 238 is provided in spherical cavity 152 of stator 150. A flexible wire 234 contained within extension 238 connects stator 150 to rotor 101. The ends of flexible wire 234 are supported with strain relief 236 to limit small-radius bending and fatigue damage to flexible wire 234 as rotor 101 rotates within cavity 152. Power is fed through the wall of rotor 101 and further on wire 235 to power system electronics 226. Note that in this embodiment, rotation of rotor 101 is limited to a range that keeps the connection point of wire 234 to rotor 101 within the volume of extension 238.

Data Transfer

With analogy to power transfer, data transfer to and from the rotor is provided through docking combined with data storage, through wireless data transfer methods, or through a minimal wired connection for rotors with limited movement. Docking-based data transfer may limit the ability of the gimbal to provide real-time data throughput, and may also be limited by the total onboard memory capacity of the rotor. Wire-based data transfer, like wire-based power transfer, limits the range of travel of the rotor, and provides a path for transfer of mechanical vibrations between the rotor and the cavity wall. While this may be acceptable for some applications, for others it will not, and therefore, wireless data transfer may be preferred.

In an embodiment, wireless data transfer is provided through radio-frequency communications, either specifically designed for this application or based on existing short-range wireless data transfer standards such as Wi-Fi or Bluetooth. In another embodiment, to minimize radio-frequency noise on a spacecraft, wireless data transfer is provided optically with a laser or LED transmitter combined with a photodetector.

Figure 9:
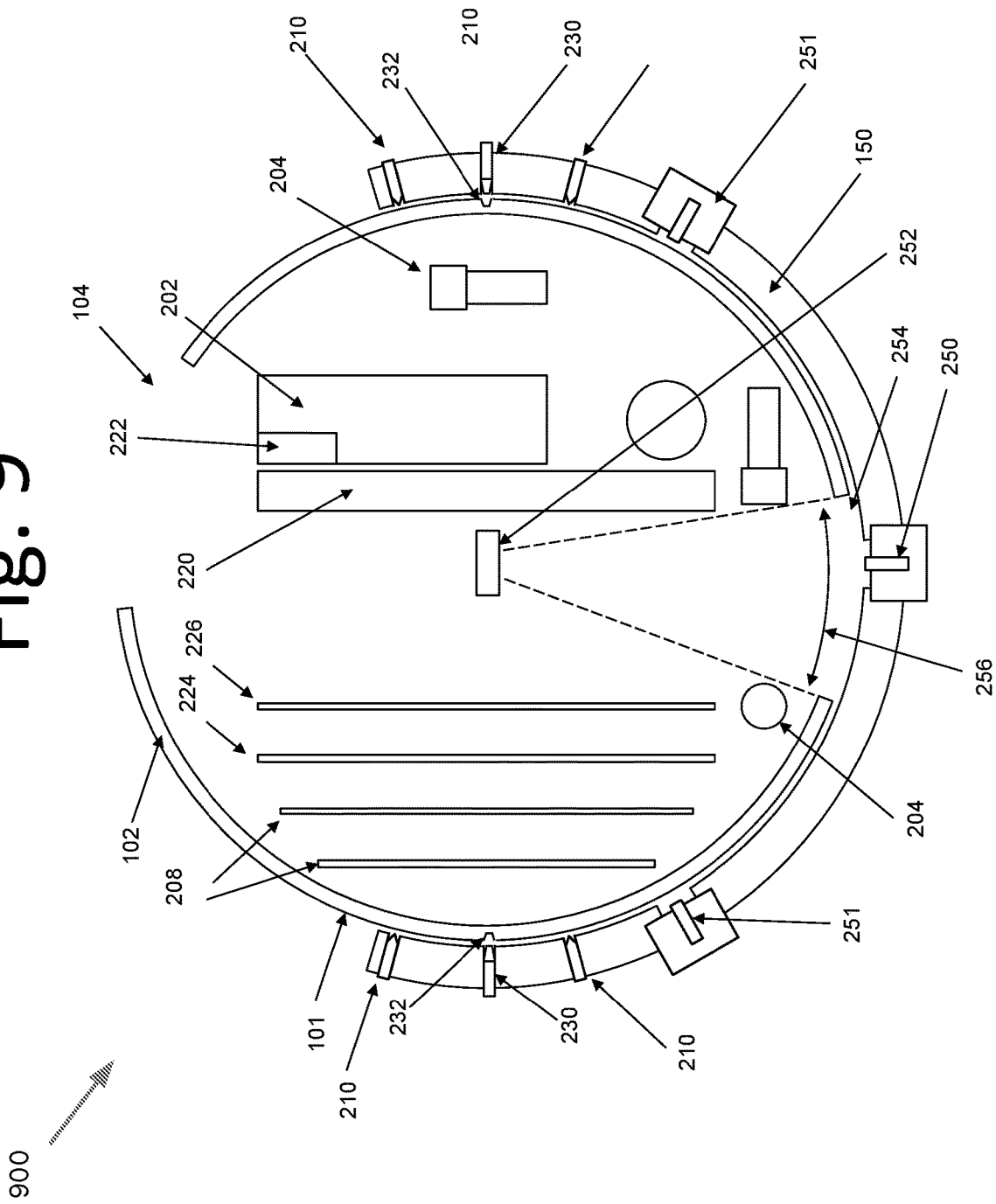
FIG. 9 is a diagram illustrating a cross-sectional view of a self-contained free-floating spherical gimbal with optical data transfer means, according to an embodiment of the present invention.

Since wireless data transfer goes both ways in some cases, both an optical transmitter and optical receiver on both the rotor and the cavity wall may be provided. Since optical beams are highly directional, data transfer is possible only when the transmitter and receiver are in one another's field of view. Further, since the rotor may move over a wide range of orientations, transmitters and receivers on its surface may not be visible to corresponding receivers and transmitters on the surface of the cavity. As such, it may be beneficial to provide recesses in the surfaces of either the rotor, cavity, or both to expand the fields of view of optical transmitters and/or receivers. For example, a conical recess in the rotor allowing an optical receiver to be placed at or very near the center of rotation may allow the receiver to be illuminated by a transmitter that is pointed toward the center of rotation and located anywhere on the cavity wall opposite the conical recess. FIG. 9 is a diagram illustrating a spherical gimbal with data transfer means, according to an embodiment of the present invention. Optical receiver 252 is located substantially at the center of rotation of rotor 101. Optical receiver 252 has a field of view 256 unobstructed by internal components in rotor 101 and corresponding to an opening 254 in the wall of rotor 101. Optical transmitter 250, mounted in the wall of stator 150, directs a beam toward the center of rotation of rotor 101 such that the beam is detected by optical receiver 252 whenever transmitter 250 is within the field of view 256. Note that field of view 256 need not have any particular cross section but may be elongated in one dimension to provide maximum flexibility in the rotation of rotor 101 while maintaining visibility to transmitter 250. Additionally, it may be beneficial to provide additional optical transmitters 251 on the cavity wall dispersed such that at least one will always be the field of view of receiver 252.

Some embodiments generally pertain to a free-floating gimbal that provides a compact system configured to enable full unencumbered rotation in three axes for laser beam or camera steering. In addition to complete steering flexibility, the free-floating gimbal reduces the vibration problem to understanding and limiting vibration associated with momentum elements—reaction wheels or CMGs. There is no mechanism to transmit vibration or random unsteady torques from the environment to the pointing system. This ensures that the pointing requirements of the laser system do not impose pointing or jitter requirements on the host spacecraft. At the same time, there is no mechanism to transmit unsteady torques from the rotor to the host, which may be relevant for small spacecraft, or any spacecraft that needs precise attitude control for other payloads.

Besides space-based laser communication applications, the free-floating spherical gimbal may be useful for aircraft-based or ground-based optical communication or other terrestrial applications requiring steady pointing, such as helicopter-mounted camera pods, for example.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A free-floating spherical gimbal ("gimbal"), comprising:
   a rotor substantially spherical in shape and partially enclosed within a larger spherical and stationary cavity, wherein
   the rotor of the spherical gimbal is maintained in a location without mechanical constraint and without direct mechanical contact with the stationary cavity or any intervening mechanical structure or element between the rotor of the spherical gimbal and the stationary cavity, thereby becoming free-floating; and
   one or more actuators mounted within a stator configured to provide forces to center the rotor within the stator.

2. The gimbal of claim 1, wherein
   the rotor comprising a spherical shell with one or more openings, providing access to one or more optical or electromagnetic signals; and
   the stator comprising a spherical cavity.

3. The gimbal of claim 2, wherein the spherical shell is constrained against lateral movement by way of enclosing a portion of the spherical shell within the spherical cavity of the stator.

4. The gimbal of claim 2, wherein the spherical cavity comprises one or more openings or transparent windows, allowing access to one or more optical or electromagnetic signals over one or more directions with respect to an orientation of a stationary portion of the gimbal.

5. The gimbal of claim 2, wherein the rotor further comprises one or more star cameras configured to measure orientation of the rotor, one or more reaction wheels configured to change orientation of the rotor through momentum conservation, battery configured to provide electric power to the rotor, and attitude-control system configured to read data from the one or more star cameras and control the reaction wheels within the rotor.

6. The apparatus of claim 5, further comprising:
   a laser transmitter housed within a cavity of the spherical shell configured to transmit a laser beam to another satellite or to ground.

7. The apparatus of claim 6, wherein the reaction wheels are configured to spin, causing a counter-rotation of the rotor to align output optics of the laser transmitter with an optical receiver on the other satellite or on the ground.

8. The gimbal of claim 1, wherein the one or more actuators are passive or active.

9. A spherical gimbal, comprising:
   a plurality of moving portion and a stationary portion, with a spherical interface between the moving portion and the stationary portion, wherein
   the moving portion is maintained in a location without mechanical constraint and without direct mechanical contact with the stationary portion or any intervening mechanical structure or element between the moving portion and the stationary portion, thereby becoming free-floating; and
   a plurality of actuators mounted in a stator and configured to provide forces necessary to center a rotor within the stator.

10. The spherical gimbal of claim 9, wherein the moving portion is free-floating by way of electrostatic, magnetic, and/or electromagnetic forces.

11. The spherical gimbal of claim 9, wherein the moving portion is free-floating by way of gas-dynamic forces.

12. The spherical gimbal of claim 9, wherein the moving portion comprises the rotor, wherein the rotor contains a plurality of moving parts; and
   wherein the stationary portion comprises the stator containing a plurality of stationary parts.

13. The spherical gimbal of claim 12, wherein the rotor comprises a shell with one or more openings, allowing access for optical signals or electromagnetic signals.

14. The spherical gimbal of claim 13, wherein the stator further comprises a cavity enclosing the rotor within, thereby constraining the shell against lateral movement.

15. The spherical gimbal of claim 12, further comprising:
   a plurality of reaction wheels are configured to spin, causing a counter-rotation of the rotor to align laser transmitter output optics with an optical receiver on another satellite.

16. The spherical gimbal of claim 12, further comprising:
   one or more star cameras incorporated within the rotor, measuring an orientation of the rotor without reference to an orientation of the stator, wherein
   the measuring of the orientation of the rotor provides a reference used to orients the rotor to direct a laser beam from output optics toward an intended receiver.

17. The spherical gimbal of claim 12, wherein the rotor is constrained within the stator providing the rotor with three degrees of rotational freedom and mechanical isolation from the stator and host.

18. The gimbal of claim 12, wherein the one or more actuators are passive or active.

19. A spherical gimbal, comprising:
   a moving portion and a stationary portion, with a spherical interface between the moving portion and the stationary portion, wherein
   the moving portion is maintained in a location without mechanical constraint and without direct mechanical contact with the stationary portion or any intervening mechanical structure or element between the moving portion and the stationary portion, thereby becoming free-floating,
   the moving portion comprising a rotor containing a plurality of moving parts, and
   the stationary portion comprising a stator containing a plurality of stationary parts; and
   a plurality of actuators mounted in the stator and configured to provide forces necessary to center the rotor within the stator.

20. The spherical gimbal of claim 19, wherein the moving portion is free-floating by way of electrostatic, magnetic, and/or electromagnetic forces.

21. The spherical gimbal of claim 19, wherein the moving portion is free-floating by way of gas-dynamic forces.

22. The spherical gimbal of claim 21, wherein the rotor comprises a shell with one or more openings, allowing access for optical signals or electromagnetic signals.

23. The spherical gimbal of claim 22, wherein the stator further comprises a cavity enclosing the rotor within, thereby constraining the shell against lateral movement.

24. The spherical gimbal of claim 19, further comprising:
   a plurality of reaction wheels are configured to spin, causing a counter-rotation of the rotor to align laser transmitter output optics with an optical receiver on another satellite.

25. The spherical gimbal of claim 19, further comprising:
   one or more star cameras incorporated within the rotor, measuring an orientation of the rotor without reference to an orientation of the stator, wherein the measuring of the orientation of the rotor provides a reference used to orients the rotor to direct a laser beam from output optics toward an intended receiver.

26. The spherical gimbal of claim 19, wherein the rotor is constrained within the stator providing the rotor with three degrees of rotational freedom and mechanical isolation from the stator and host.

27. The spherical gimbal of claim 19, wherein the one or more actuators are passive or active.

* * * * *